United States Patent

Park

[11] Patent Number: 6,049,513
[45] Date of Patent: Apr. 11, 2000

[54] METHOD AND APPARATUS FOR ADJUSTING A FOCUS BIAS IN AN OPTICAL DISC PLAYER

[75] Inventor: Soon-Bae Park, Seoul, Rep. of Korea

[73] Assignee: Daewoo Electronics Co., Ltd., Seoul, Rep. of Korea

[21] Appl. No.: 09/069,834

[22] Filed: Apr. 30, 1998

[30] Foreign Application Priority Data

May 29, 1997 [KR] Rep. of Korea ............. 97-21559

[51] Int. Cl.$^7$ .............................................. G11B 7/00
[52] U.S. Cl. .................... 369/44.34; 369/44.29; 369/44.35
[58] Field of Search ................. 369/44.25, 44.27, 369/44.29, 44.34, 44.35, 44.41

[56] References Cited

U.S. PATENT DOCUMENTS

| | | | |
|---|---|---|---|
| 5,339,298 | 8/1994 | Saito | 369/59 |
| 5,627,807 | 5/1997 | Abe | 369/54 |
| 5,712,842 | 1/1998 | Yamamoto et al. | 369/44.23 |
| 5,805,559 | 9/1998 | Murakami et al. | 369/58 |

*Primary Examiner*—Nabil Hindi
*Attorney, Agent, or Firm*—Smith, Gambrell & Russell, LLP

[57] ABSTRACT

A method and an apparatus in which a bias of a focus servo circuit is adjusted so that a signal surface of an optical disc may be placed within a focus depth of a laser beam. In the apparatus for adjusting a focus bias, a characteristic variation of a focus bias is checked on the basis of a level of a reproduction signal, i.e., an RF signal, supplied from the optical pickup, and a focus bias is adjusted in response to a checked characteristic variation. Therefore, although the characteristics of the focus servo section is varied, the focus bias is optimally adjusted in response to the characteristic variation, so that an accurate focusing operation is performed.

4 Claims, 3 Drawing Sheets

METHOD AND APPARATUS FOR ADJUSTING A FOCUS BIAS IN AN OPTICAL DISC PLAYER

BACKGROUND OF THE INVENTION

1. Field of the Invention

The present invention relates to a method and an apparatus in which a bias of a focus servo circuit is adjusted so that a signal surface of an optical disc may be placed within a focus depth of a laser beam.

2. Description of the Prior Art

Conventionally, after irradiating a laser beam onto a signal surface of an optical disc, an optical disc player converts light reflected therefrom into an electric signal, and thereby reads out data which is recorded on the optical disc.

In the optical disc player known heretofore, it is customary to execute the following servo control.

For example, a light beam emitted from a light source is irradiated to the surface of an optical disc, and a return light beam from the optical disc is received by a photo detector.

A focus error signal and a tracking error signal are detected on the basis of the outputs of focus sensors which are divisions of the photo detector.

The focus error signal and the tracking error signal thus detected are supplied to a focus servo circuit and a tracking servo circuit, respectively and thereby execute focus servo control and tracking servo control.

FIG. 1 is a block diagram for showing a circuit configuration of a conventional optical disc player. As shown in FIG. 1, an optical disc player 1 comprises an optical pickup 2, a tracking servo circuit 5 and a focus servo circuit 6 which receive, via amplifier 3 and 4 respectively, a tracking error signal and a focus error signal obtained on the basis of the difference between the light quantities of individual light receiving elements of a photo detector in optical pickup 2.

Optical disc player 1 further comprises a tracking driver 7 for driving an actuator of optical pickup 2 under control on the basis of a servo signal from tracking servo circuit 5 to thereby move an objective lens in the tracking direction, a focus driver 8 for driving the actuator of optical pickup 2 under control on the basis of a servo signal from focus servo circuit 6 to thereby move the objective lens in the focusing direction, and an adding circuit 9A for applying a focus bias, which is obtained from the focus bias generator circuit 9, to the focus error signal outputted from amplifier 4.

Optical pickup 2 has a known structure wherein an objective lens (not shown) is held to be movable biaxially, so that when a tracking coil and a focus coil provided in the actuator are fed with current, the objective lens can be driven biaxially under control in both of the tracking and focusing directions.

Tracking servo circuit 6 is applied with the tracking error signal obtained from optical pickup 2 and amplified by amplifier 3, and then outputs a tracking control signal to driver 7 in accordance with the tracking error signal so as to minimize the tracking error.

Focus servo circuit 6 is supplied with the focus error signal obtained from optical pickup 2 and amplified by amplifier 4, and then outputs a focus control signal to driver 8 in accordance with the focus error signal so as to minimize the focus error.

Driver 7 serves to drive the actuator of optical pickup 2 in response to the tracking control signal received from tracking servo circuit 5 and thereby moves the objective lens in the tracking direction to minimize the tracking error.

Meanwhile, driver 8 serves to drive the actuator of optical pickup 2 in response to the focus control signal received from focus servo circuit 6 and thereby moves the objective lens in the focusing direction to minimize the focus error.

Since the minimum point of the focus error signal may sometimes fail to coincide with the least jitter point of a reproduced signal, a focus bias obtained from the focus bias generator circuit 9 is applied to the focus error signal for causing the minimum point of the focus error signal to coincide with the least jitter point of a reproduced signal.

In optical disc player 1 of the structure mentioned above, the focus error bias is adjusted in the following manner.

At the time of assembling optical disc player 1, focusing is performed in an on-state of the focus servo, and an adjusting rheostat 9B incorporated in the focus bias generator circuit 9 is manually operated while observing the RF signal from optical pickup 2 and monitoring the value of the jitter, whereby an optimal focus bias is determined with respect to the individual optical disc player 1.

However, in the optical disc player of the above structure, a time required for determining the focus bias is long with another disadvantage of necessitating the adjusting rheostat 9B, hence raising a problem of higher cost with regard to the component parts.

Further, in an operation of recording data on and/or reproducing the same from the optical disc, the refractive index of the optical disc to an incident light beam is rendered different if the material of the disc is different, so that the incident light quantity of the return light beam to the photo detector may also be changed. In addition, occurrence of an ambient temperature fluctuation brings about some harmful influences inclusive of a positional deviation of the objective lens due to the resultant temperature fluctuation in the apparatus.

Also, after the focus bias is determined by an experiment and the like, a determined focus bias is stored in a memory and the like which is included in the optical disc player. However, when the bias is thus pre-set, the focus bias is changed due to the aging of the optical disc player and thereby may incur the malfunction of the optical disc player.

Consequently, it become difficult to adjust the focus bias exactly to its optimal value in the reproduction of data from the optical disc.

SUMMARY OF THE INVENTION

Therefore, It is an object of the present invention to provide a method which checks a characteristic variation of a focus bias on the basis of a level of a reproduction signal supplied from an optical pickup of an optical disc player, and which adjusts a focus bias in response to a checked characteristic variation.

It is another object of the present invention to provide an apparatus which checks a characteristic variation of a focus bias on the basis of a level of a reproduction signal supplied from an optical pickup of an optical disc player, and which adjusts a focus bias in response to a checked characteristic variation.

In order to achieve the above objects, the present invention provides a method for adjusting a focus bias in an optical disc player, which comprises the steps of:

(a) reading out data recorded on an optical disc to generate an RF signal corresponding to a reproduction signal and generating a focus servo control signal;

(b) detecting a focus error signal while inputting the focus servo control signal generated in step (a), and generating a focus control signal in response to a detected focus error signal;

(c) setting a plurality of focus biases of different signal levels and generating a focus bias having a predetermined signal level;

(d) equalizing a waveform of the RF signal generated in step (a) and generating a waveform-equalized RF signal;

(e) converting the waveform-equalized RF signal generated in step (d) into a train of pulses and generating a pulse train signal;

(f) detecting a pulse corresponding to a synchronizing signal among the pulse train signal generated in step (e) and generating a detected synchronizing signal;

(g) holding a peak value of the synchronizing signal detected in step (f) and generating a held peak signal;

(h) detecting leading edges of the synchronizing signal detected in step (f) and generating a leading edge detection signal corresponding to a train of pulses in response to detected leading edges;

(i) delaying the held peak signal generated in step (g) for a predetermined time interval and generating a delayed peak hold signal in response to a first leading edge detection signal generated in step (h) until a second leading edge detection signal provided just after the first leading edge detection signal is applied;

(j) comparing the peak hold signal delayed in step (i) with the peak signal held in step (g) and generating a comparison signal; and (k) adjusting the focus bias generated in step (c) in order for a magnitude of the peak signal held in step (g) to be greater than a magnitude of the peak hold signal delayed in step (i).

In order to achieve the above objects, the present invention provides an apparatus for adjusting a focus bias in an optical disc player, which comprises:

optical pickup means for reading out data recorded on an optical disc to provide an RF signal corresponding to a reproduction signal and for providing a focus servo control signal;

focus servo means for detecting a focus error signal while inputting the focus servo control signal from said optical pickup means, and for providing a focus control signal to said optical pickup means in response to a detected focus error signal;

focus bias generating means, having a plurality of set focus biases of different signal levels, for providing a focus bias having a predetermined signal level to said focus servo means;

waveform equalizing means for equalizing a waveform of the RF signal from said optical pickup means and for providing a waveform-equalized RF signal;

data slicing means for converting the waveform-equalized RF signal from said waveform equalizing means into a train of pulses and for providing a pulse train signal;

synchronizing signal detecting means for detecting a pulse corresponding to a synchronizing signal among the pulse train signal from said data slicing means and for providing a detected synchronizing signal;

peak holding means for holding a peak value of the synchronizing signal detected by said synchronizing signal detecting means and for providing a held peak signal;

leading edge detecting means for detecting leading edges of the synchronizing signal detected by said synchronizing signal detecting means and for providing a leading edge detection signal corresponding to a train of pulses in response to detected leading edges;

step delaying means for delaying the held peak signal from said peak holding means for a predetermined time interval and for providing a delayed peak hold signal in response to a first leading edge detection signal from said leading edge detecting means until a second leading edge detection signal provided just after the first leading edge detection signal, is applied;

comparing means for comparing the peak hold signal delayed by said step delaying means with the peak signal held by said peak holding means and for providing a comparison signal; and control means for adjusting the focus bias from said focus bias generating means in order for a magnitude of the peak signal held by said peak holding means to be greater than a magnitude of the peak hold signal delayed by said step delaying means.

In the method and apparatus for adjusting a focus bias in an optical disc player according to the present invention, a characteristic variation of a focus bias is checked on the basis of a level of a reproduction signal, i.e., an RF signal, supplied from the optical pickup, and a focus bias is adjusted in response to a checked characteristic variation. Therefore, although the characteristics of the focus servo section is varied, the focus bias is optimally adjusted in response to the characteristic variation, so that an accurate focusing operation is performed.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENTS

A description will be given below in detail with reference to accompanying drawings to a configuration and an operation of a method and an apparatus for adjusting a focus bias in an optical disc player, according to an embodiment of the present invention.

Figure 1:
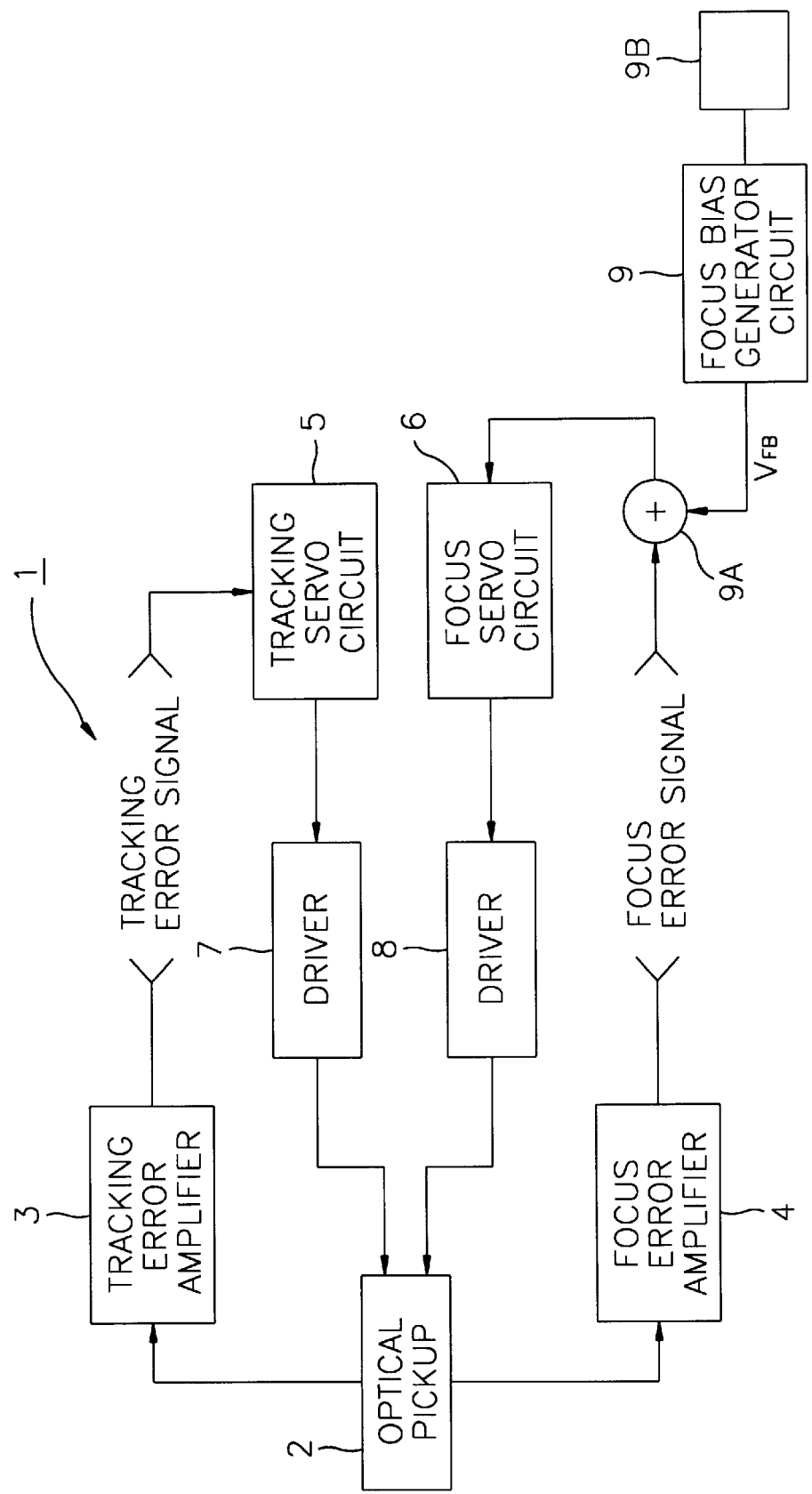
FIG. 1 is a block diagram for showing a circuit configuration of a conventional optical disc player.
Figure 2:
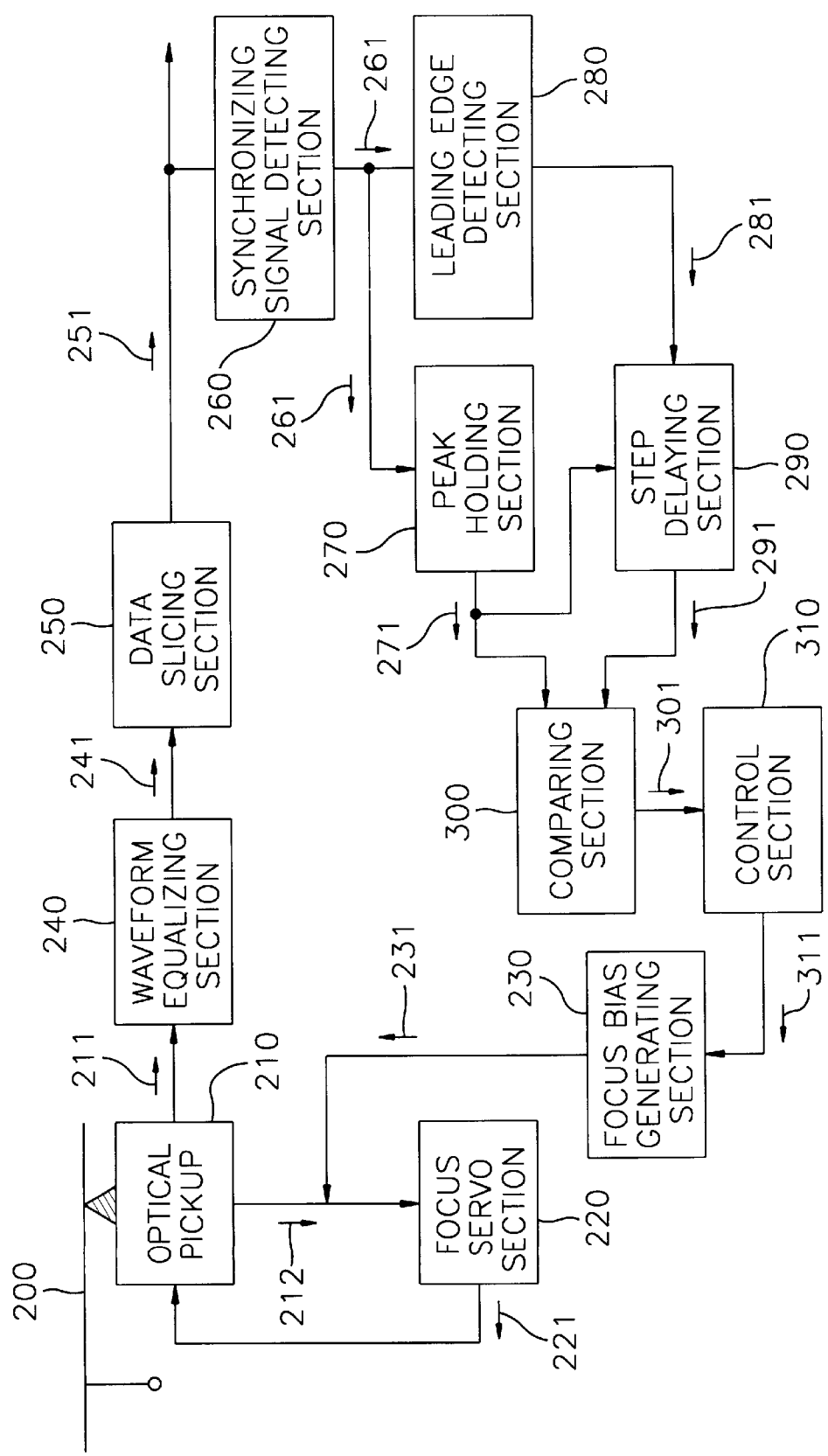
FIG. 2 is a block diagram for showing a circuit configuration of an apparatus for adjusting a focus bias in an optical disc player, according to an embodiment of the present invention.

FIG. 2 is a block diagram for showing a circuit configuration of an apparatus for adjusting a focus bias in an optical disc player, according to an embodiment of the present invention. As shown in FIG. 2, the apparatus for adjusting a focus bias comprises an optical pickup 210, a focus servo section 220, a focus bias generating section 230, a waveform equalizing section 240, a data slicing section 250, a synchronizing signal detecting section 260, a peak holding section 270, a leading edge detecting section 280, a step delaying section 290, a comparing section 300 and a control section 310.

Optical pickup 210 reads out data recorded on an optical disc 200 to provide a radio frequency signal (hereinafter, referred to as "RF signal") 211 corresponding to a reproduction signal and for provides a focus servo control signal 212.

Focus servo section 220 detects a focus error signal while inputting focus servo control signal 212 from optical pickup 210, and provides a focus control signal 221 to optical pickup 210 in response to a detected focus error signal.

Focus bias generating section 230 has a plurality of focus biases of different signal levels which are set therein, and provides a focus bias 231 having a predetermined signal level to focus servo section 220.

Waveform equalizing section 240 equalizes a waveform of RF signal 211 from optical pickup 210 and provides a waveform-equalized RF signal 241.

Data slicing section 250 converts waveform-equalized RF signal 241 from waveform equalizing section 240 into a train of pulses and provides a pulse train signal 251.

Synchronizing signal detecting section 260 detects only a pulse corresponding to a synchronizing signal among pulse train signal 251 from data slicing section 250 and provides a detected synchronizing signal 261.

Peak holding section 270 holds peak values of synchronizing signal 261 detected by synchronizing signal detecting section 260 and provides a held peak signal 271.

Leading edge detecting section 280 detects leading edges of synchronizing signal 261 detected by synchronizing signal detecting section 260 and provides a leading edge detection signal 281 corresponding to a train of pulses in response to detected leading edges.

Step delaying section 290 delays held peak signal 271 from peak holding section 270 for a predetermined time interval, and then provides a delayed peak hold signal 291 in response to a first leading edge detection signal 281 from leading edge detecting section 280 until a second leading edge detection signal 281 provided just after first leading edge detection signal 281, is applied.

Comparing section 300 compares peak hold signal 291 delayed by step delaying section 290 with peak signal 271 held by peak holding section 270 and provides a comparison signal 301.

Control section 310 provides a control signal 311 for adjusting focus bias 231 from focus bias generating section 230 in order for a magnitude of peak signal 271 held by peak holding section 270 to be greater than that of peak hold signal 291 delayed by step delaying section 290. Then, the operation of control section 310 for adjusting the focus bias 231 is based on a first comparison signal 301 from comparing section 300 during a supply of a first focus bias 231 from focus bias generating section 230, and on a second comparison signal 301 from comparing section 300 during a supply of a second focus bias 231 therefrom whose signal level is higher or lower than first focus bias 231.

A description will next be made of an operation of the apparatus or the procedure of the method for adjusting a focus bias of the circuit configuration mentioned above while referring to the timing charts of FIGS. 3A to 3E.

Optical pickup 210 reads out, via the light beam, data which is recorded on optical disc 200 to provide RF signal 211 corresponding to the reproduction signal to waveform equalizing section 240, and provides focus servo control signal 212 to focus servo section 220.

Focus servo section 220 inputs focus servo control signal 212 from optical pickup 210 to detect the focus error signal, and provides focus control signal 221 in order to minimize a detected focus error signal. The objective lens (not shown) which is installed in optical pickup 2 moves in the focusing direction in response to focus control signal 221 to minimize the focus error, and the signal surface of optical disc 200 is placed within the the focus depth of the laser beam of optical pickup 210.

At this time, a plurality of focus biases 231 whose signal levels increase by degrees, are set within focus bias generating section 230, and focus bias 231 having a middle level is provided to focus servo section 220 under the control of control section 310 in the begging.

In order to minimize the interference among codes, waveform equalizing section 240 equalizes a waveform of RF signal 211 and provides waveform-equalized RF signal 241 to data slicing section 250. Data slicing section 250 converts waveform-equalized RF signal 241 into a train of pulses and provides pulse train signal 251 to a digital signal processing equipment (not shown) and synchronizing signal detecting section 260, respectively, both of which are connected to a post-stage of data slicing section 250.

Synchronizing signal detecting section 260 detects only a pulse corresponding to a synchronizing signal among pulse train signal 251 from data slicing section 250 and provides detected synchronizing signal 261 (refer to FIG. 3A) to peak holding section 270 and to leading edge detecting section 280.

Figure 3A:
FIG. 3A is a timing chart for showing an output waveform of a synchronizing signal detecting section shown in FIG. 2.
Figure 3B:
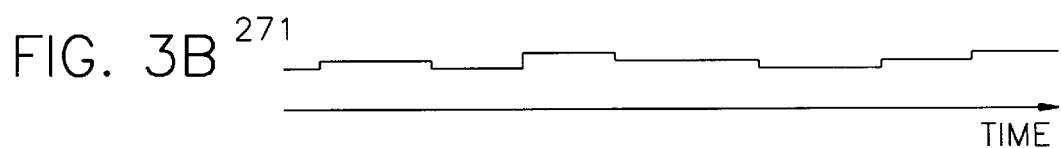
FIG. 3B is a timing chart for showing an output waveform of a peak holding section shown in FIG. 2.
Figure 3C:
FIG. 3C is a timing chart for showing an output waveform of a leading edge detecting section shown in FIG. 2.
Figure 3D:
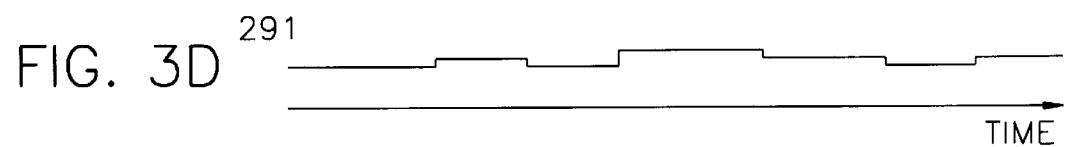
FIG. 3D is a timing chart for showing an output waveform of a step delaying section shown in FIG. 2.
Figure 3E:
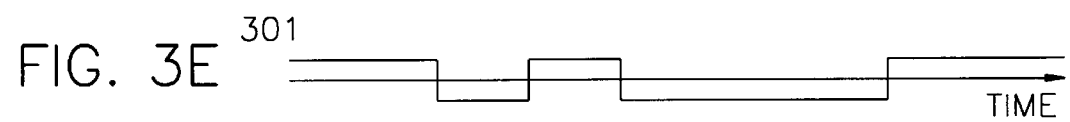
FIG. 3E is a timing chart for showing an output waveform of a comparing section shown in FIG. 2.

Peak holding section 270 holds the peak values of detected synchronizing signal 261 and provides held peak signal 271 (refer to FIG. 3B). Whenever detecting leading edges of detected synchronizing signal 261, leading edge detecting section 280 provides leading edge detection signal 281 (refer to FIG. 3C) corresponding to a train of pulses in response to detected leading edges to step delaying section 290.

After delaying held peak signal 271 for a predetermined time interval, in response to a first leading edge detection signal 281 from leading edge detecting section 280, step delaying section 290 provides delayed peak hold signal 291 (refer to FIG. 3D) to comparing section 300 until a second leading edge detection signal 281 which is provided just after first leading edge detection signal 281, is applied.

Comparing section 300 compares delayed peak hold signal 291 with held peak signal 271 and provides a comparison signal 301 having a high level to control section 310 (refer to FIG. 3E) while a magnitude of held peak signal 271 is greater than that of delayed peak hold signal 291. In a contrary case, comparison signal 301 having a low level (refer to FIG. 3E) is provided to control section 310.

Here, when comparison signal 301 from comparing section 300 has a high level, it means that a level of a first RF signal 211 which is currently supplied from optical pickup 210 gets to be higher than a level of a second RF signal 211 which was provided just before first RF signal 211. In a contrary case, it means that a level of a first RF signal 211 gets to be lower than a level of a second RF signal 211. Also, that the level of RF signal 211 gets to be higher than a previous level thereof, indicates that focus bias 231 is adjusted more precisely than in the previous time. In a contrary case, it indicates that focus bias 231 is adjusted more imprecisely than in the previous time.

Therefore, when a low level of comparison signal 301 is supplied from comparing section 300, control section 310 recognizes focus bias 231 to be imprecise and controls focus bias generating section 230 to produce a higher or lower level of focus bias 231.

For example, in the case where focus bias generating section 230 provides a second focus bias whose signal level is higher than that of a previous first focus bias, while a high level of comparison signal 301 is being supplied from comparing section 300, control section 310 controls focus bias generating section 230 to provide a higher level of focus bias 231 to focus servo section 220. On the contrary, when a low level of comparison signal 301 is provided, control section 310 controls focus bias generating section 230 to provide a lower level of focus bias 231 to focus servo section 220.

Meanwhile, in the case where focus bias generating section 230 provide a second focus bias whose signal level is lower than that of a previous first focus bias, while a high level of comparison signal 301 is being supplied from comparing section 300, control section 310 controls focus bias generating section 230 to continually provide a lower level of focus bias 231 to focus servo section 220. On the contrary, when a low level of comparison signal 301 is provided, control section 310 controls focus bias generating section 230 to provide a higher level of focus bias 231 to focus servo section 220.

When an optimal focus bias 231 is provided to focus servo section 220 by performing the operation process as described above, a level of RF signal 211 which is supplied from optical pickup 210, appears to have a highest value.

In the method and apparatus for adjusting a focus bias in an optical disc player according to the present invention, a characteristic variation of a focus bias is checked on the basis of a level of a reproduction signal, i.e., an RF signal, supplied from the optical pickup, and a focus bias is adjusted in response to a checked characteristic variation. Therefore, although the characteristics of the focus servo section is varied, the focus bias is optimally adjusted in response to the characteristic variation, so that an accurate focusing operation is performed.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for adjusting a focus bias in an optical disc player, said method comprising the steps of:
   (a) reading out data recorded on an optical disc to generate an RF signal corresponding to a reproduction signal and generating a focus servo control signal;
   (b) detecting a focus error signal while inputting the focus servo control signal generated in step (a), and generating a focus control signal in response to a detected focus error signal;
   (c) setting a plurality of focus biases of different signal levels and generating a focus bias having a predetermined signal level;
   (d) equalizing a waveform of the RF signal generated in step (a) and generating a waveform-equalized RF signal;
   (e) converting the waveform-equalized RF signal generated in step (d) into a train of pulses and generating a pulse train signal;
   (f) detecting a pulse corresponding to a synchronizing signal among the pulse train signal generated in step (e) and generating a detected synchronizing signal;
   (g) holding a peak value of the synchronizing signal detected in step (f) and generating a held peak signal;
   (h) detecting leading edges of the synchronizing signal detected in step (f) and generating a leading edge detection signal corresponding to a train of pulses in response to detected leading edges;
   (i) delaying the held peak signal generated in step (g) for a predetermined time interval and generating a delayed peak hold signal in response to a first leading edge detection signal generated in step (h) until a second leading edge detection signal provided just after the first leading edge detection signal is applied;
   (j) comparing the peak hold signal delayed in step (i) with the peak signal held in step (g) and generating a comparison signal; and
   (k) adjusting the focus bias generated in step (c) in order for a magnitude of the peak signal held in step (g) to be greater than a magnitude of the peak hold signal delayed in step (i).

2. The method for adjusting a focus bias in an optical disc player as claimed in claim 1, wherein said step (k) is based on a first comparison signal generated in step (j) during a generation of a first focus bias in step (c), and on a second comparison signal generated in step (j) during a generation of a second focus bias in step (c) having a signal level being higher or lower than the first focus bias.

3. An apparatus for adjusting a focus bias in an optical disc player, said apparatus comprising:
   optical pickup means for reading out data recorded on an optical disc to provide an RF signal corresponding to a reproduction signal and for providing a focus servo control signal;
   focus servo means for detecting a focus error signal while inputting the focus servo control signal from said optical pickup means, and for providing a focus control signal to said optical pickup means in response to a detected focus error signal;
   focus bias generating means, having a plurality of set focus biases of different signal levels, for providing a focus bias having a predetermined signal level to said focus servo means;
   waveform equalizing means for equalizing a waveform of the RF signal from said optical pickup means and for providing a waveform-equalized RF signal;
   data slicing means for converting the waveform-equalized RF signal from said waveform equalizing means into a train of pulses and for providing a pulse train signal;
   synchronizing signal detecting means for detecting a pulse corresponding to a synchronizing signal among the pulse train signal from said data slicing means and for providing a detected synchronizing signal;
   peak holding means for holding a peak value of the synchronizing signal detected by said synchronizing signal detecting means and for providing a held peak signal;
   leading edge detecting means for detecting leading edges of the synchronizing signal detected by said synchronizing signal detecting means and for providing a leading edge detection signal corresponding to a train of pulses in response to detected leading edges;
   step delaying means for delaying the held peak signal from said peak holding means for a predetermined time interval and for providing a delayed peak hold signal in response to a first leading edge detection signal from said leading edge detecting means until a second leading edge detection signal provided just after the first leading edge detection signal, is applied;

comparing means for comparing the peak hold signal delayed by said step delaying means with the peak signal held by said peak holding means and for providing a comparison signal; and control means for adjusting the focus bias from said focus bias generating means in order for a magnitude of the peak signal held by said peak holding means to be greater than a magnitude of the peak hold signal delayed by said step delaying means.

4. The apparatus for adjusting a focus bias in an optical disc player as claimed in claim 3, wherein the operation of said control means for adjusting the focus bias is based on a first comparison signal from said comparing means during a supply of a first focus bias from said focus bias generating means, and on a second comparison signal from said comparing means during a supply of a second focus bias therefrom having a signal level being higher or lower than the first focus bias.

* * * * *